Patented Mar. 2, 1943

2,312,693

UNITED STATES PATENT OFFICE 2,312,693

REACTION PRODUCT OF ALDEHYDES AND DIAZINE DERIVATIVES

Gaetano F. D'Alelio, Pittsfield, Mass., assignor to General Electric Company, a corporation of New York No Drawing. Application November 1, 1941, Serial No. 417,505

21 Claims. (Cl. 260—72)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a diazine derivative corresponding to the following general formula:

I

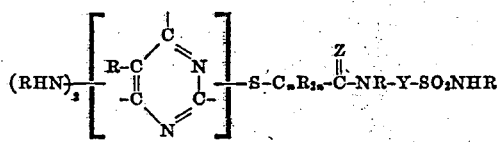

In the above formula $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and substituted hydrocarbon radicals, more particularly halo-hydrocarbon radicals. Since $n$ represents an integer which is 1 or 2, it will be seen that the linkage of the sulfamyl-carbocyclic-carbamyl - alkyl or sulfamyl - carbocyclic-thiocarbamyl-alkyl grouping to the sulfur atom in all cases will be alpha or beta to the sulfamyl - carbocyclic - carbamyl or thiocarbamyl grouping. It also will be observed that linkage of the pyrimidyl grouping to the sulfur atom is through a carbon atom.

Illustrative examples of radicals that R in the above formula may represent are: aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, bromotolyl, etc. Preferably R in the above formula is hydrogen. Also especially suitable for use in carrying the present invention into effect are diazine derivatives corresponding to the general formulas:

II

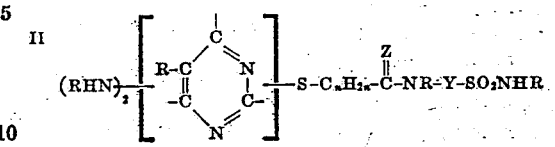

and, more particularly,

III

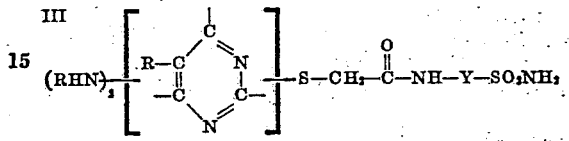

where $n$, Z, Y and R have the meanings above given with reference to Formula I.

Illustrative examples of divalent carbocyclic radicals that Y in Formulas I, II and III may represent are: arylene, e. g., phenylene, xenylene, naphthylene, etc.; alkarylene, e. g., 1,4-tolylene, para-(2,3-xylylene), etc.; cycloalkylene, e. g., cyclopentylene, cyclohexylene, etc.; cycloalkenylene, e. g., cyclopentenylene, cyclohexenylene, etc.; and their homologues, as well as those divalent carbocyclic radicals with one or more of their hydrogen atoms replaced by a substituent, e. g., halogeno, amino, acetyl, acetoxy, carbalkoxy, alkoxy, aryloxy, hydroxy, alkyl, alkenyl, etc. Specific examples of substituted divalent carbocyclic radicals are chlorophenylene, bromophenylene, chloronaphthylene, bromonaphthylene, bromo 1,4-tolylene, chlorocyclopentylene, chlorocyclopentenylene, carbomethoxyphenylene, ethoxyphenylene, acetophenylene, acetoxyphenylene, bromocyclopentylene, aminophenylene, phenoxyphenylene, hydroxyphenylene, methylphenylene (tolylene), allylphenylene, etc. Preferably Y is phenylene or methylphenylene.

Instead of the 1,3- or meta-diazine derivatives represented by the above formulas, the corresponding 1,2- or ortho-diazines (pyridazines) or the 1,4- or para-diazines (pyrazines) may be used. Also, instead of the diazinyl monosulfides represented by the above formulas, the di- and trisulfides of the diazines (ortho, meta or para) may be employed.

The diazine derivatives that are used in carrying the present invention into effect are more fully described and claimed in my copending application Serial No. 417,503, filed concurrently herewith and assigned to the same assignee as the present invention. As pointed out in the said copending application, the diazine derivatives employed as starting reactants in practicing the present invention are prepared by effecting reaction between a diamino [(—NHR)$_2$] mercapto pyrimidine and a sulfamyl-carbocyclic-carbamyl (or thiocarbamyl)-alkyl halide in the presence of a hydrohalide acceptor, e. g., an alkali-metal hydroxide. The reaction preferably is effected in the presence of a suitable solvent or mixture of solvents, e. g., water or a mixture of water and alcohol. These diazine derivatives also may be prepared by effecting reaction between a halogenated diamino pyrimidine and a sulfamyl-carbocyclic-carbamyl (or thiocarbamyl) mercapto alkane in the presence of a hydrohalide acceptor. This reaction preferably is carried out in the presence of an anhydrous solvent, e. g., alcohol.

Specific examples of diazinyl sulfamyl-carbocylic-carbamyl-alkyl sulfides and diazinyl sulfamyl-carbocyclic-thiocarbamyl-alkyl sulfides that may be used in producing my new condensation products are listed below:

4,6-diamino pyrimidyl-2 para-sulfamyl-phenyl-carbamyl-methyl sulfide 2,6-diamino pyrimidyl-4 para-sulfamyl-phenyl-carbamyl-methyl sulfide 4,6-diamino pyrimidyl-2 para-sulfamyl-phenyl-thiocarbamyl-methyl sulfide 4,6-diamino pyrimidyl-2 para-sulfamyl-tolyl-carbamyl-methyl sulfide 4,6-diamino pyrimidyl-2 beta-(para-sulfamyl-phenyl-carbamyl-ethyl) sulfide 4,6-diamino pyrimidyl-2 beta-(para-sulfamyl-phenyl-thiocarbamyl-ethyl) sulfide 4,6-diamino pyrimidyl-2 beta-(para-sulfamyl-tolyl-carbamyl-ethyl) sulfide 4,6-diamino pyrimidyl-2 para-sulfamyl-tolyl-thiocarbamyl-methyl sulfide 4,6-diamino pyrimidyl-2 meta-sulfamyl-phenyl-carbamyl-methyl sulfide 4,6-diamino pyrimidyl-2 ortho-sulfamyl-phenyl-carbamyl-methyl sulfide 4,6- di - (methylamino) 5-methyl pyrimidyl-2 beta-(para-sulfamyl-phenyl-carbamyl - ethyl) sulfide 4-chloroethylamino 6-methylamino pyrimidyl-2 alpha - (meta - sulfamyl - phenyl - carbamyl-ethyl) sulfide 4,6-di-(anilino) 5 - butyl pyrimidyl - 2 alpha-[(para-sulfonyl methylamide) phenyl-thiocarbamyl-phentyl] sulfide 4-xenylamino 5-cyclopentyl 6-pentylamino pyrimidyl - 2 ortho - sulfamyl - phenyl - (methyl) - carbamyl-methyl sulfide 2-toluido 4-amino 5-cyclohexenyl pyrimidyl-6 beta-(4'-sulfamyl-naphthyl - [1'] - carbamyl-3''-butenyl) sulfide 2-allylamino 4-amino 5-phenyl pyrimidyl-6 beta-[para-sulfamyl-chlorophenyl - carbamyl - (alpha-ethyl beta-phenyl)-ethyl] sulfide 2 - pentylamino 4 - (chlorophenylamino) pyrimidyl-6 (sulfonyl pentylamide)-tolyl - carbamyl-(cyclopentyl)-methyl sulfide 2,4-diamino pyrimidyl-6 sulfamyl - phenyl - carbamyl-(cyclopentyl) - methyl sulfide 2-dichloroanilino 4-propylamino 5-tolyl pyrimidyl-6 (sulfonyl 3'-butenylamide)-chlorotolyl-(butyl)-carbamyl-methyl sulfide 2-cycloheptylamino 4 - butylamino pyrimidyl-6 para-(sulfonyl cyclohexylamide)-phenyl-(cyclopentyl)-thiocarbamyl-methyl sulfide 4-amino 6-chloroxenylamino pyrimidyl-2 para-(sulfonyl phenylamide)-phenyl-(chloroethyl)-carbamyl-methyl sulfide 4-xylidino 5-naphthyl 6-ethylanilino pyrimidyl-2 (4' - sulfonyl chlorotolylamide) - cyclohexyl-(phenyl)-carbamyl-methyl sulfide 4-propylanilino 5-benzyl 6-benzylamino pyrimidyl-2 3'-sulfamyl-cyclopentyl-carbamyl - (tolyl)-methyl sulfide 4-cyclopentenylamino 5-(2'-butenyl) 6-phenethylamino pyrimidyl - 2 beta - [(para - sulfonyl propylphenylamide) - phenyl-(bromophenyl)-thiocarbamyl-ethyl] sulfide 4,6 - diamino 5-bromotolyl pyrimidyl - 2 beta-[(para - sulfonyl phenylchloroethylamide)-phenyl-(xenyl)-carbamyl-(alpha-chlorotolyl)-ethyl] sulfide 4 - amino 5 - phenylpropyl 6 - chlorocyclohexyl-amino pyrimidyl-2 meta-(sulfonyl naphthylamide)-phenyl-carbamyl-methyl sulfide 4-butylamino 6-bromonaphthylamino pyrimidyl-2 ortho-(sulfonyl chloropropylamide) - phenyl-carbamyl-methyl sulfide 4,6-diamino 5-phenylpropyl pyrimidyl-2 beta-[para - sulfamyl-phenyl-carbamyl-(alpha-bromo-phenyl)-ethyl] sulfide 4-bromobutylamino 5-chlorobutyl 6 -chlorobenzylamino pyrimidyl-2 para-(sulfonyl methylamide) - phenyl - (methyl) - carbamyl-(naphthyl)-(tolyl)-methyl sulfide 4,6-diamino pyrimidyl-2 ortho - sulfamyl - tolyl-thiocarbamyl-methyl sulfide 4,6-diamino pyrimidyl - 2 meta - sulfamyl - tolyl-thiocarbamyl-methyl sulfide 2,6-diamino pyrimidyl-4 ortho-sulfamyl-phenyl-carbamyl-methyl sulfide 2,6-diamino pyrimidyl-4 ortho-sulfamyl-phenyl-thiocarbamyl-methyl sulfide 2,6-diamino pyrimidyl-4 meta-sulfamyl-phenyl-carbamyl-methyl sulfide 2,6-diamino pyrimidyl-4 para-sulfamyl-phenyl-thiocarbamyl-methyl sulfide 2,6-diamino pyrimidyl-4 beta - (ortho-sulfamyl-phenyl-carbamyl-ethyl) sulfide 4,6-diamino pyrimidyl-2 beta-(ortho-sulfamyl-phenyl-carbamyl-ethyl) sulfide 2,6-diamino pyrimidyl-4 beta-(meta-sulfamyl-phenyl-carbamyl-ethyl) sulfide 2,6-diamino pyrimidyl-4 beta-(para-sulfamyl-phenyl-carbamyl-ethyl) sulfide 2,6-diamino pyrimidyl-4 beta-(ortho-sulfamyl-phenyl-thiocarbamyl-ethyl) sulfide 2,6-diamino pyrimidyl-4 alpha-(para-sulfamyl-phenyl-carbamyl-ethyl) sulfide 4,6-diamino pyrimidyl-2 alpha-(meta-sulfamyl-phenyl-carbamyl-ethyl) sulfide 4,6-diamino pyrimidyl-2 alpha-(ortho-sulfamyl-phenyl-thiocarbamyl-ethyl) sulfide 4,6-diamino pyrimidyl-2 alpha-(para-sulfamyl-tolyl-carbamyl-ethyl) sulfide.

The formulas for most of the above compounds are shown in my above-identified copending application Serial No. 417,503.

The present invention is based on my discovery that new and valuable materials of particular utility in the plastics and coating arts can be produced by effecting reaction between ingredients comprising essentially an aldehyde, including polymeric aldehydes and aldehyde-addition products, and certain diazinyl sulfamyl-carbocyclic-carbamyl (or thiocarbamyl) -alkyl sulfides, numerous examples of which have been given above and in my above-identified copending application.

Resins heretofore have been made by condensing an aldehyde with a pyrimidine thioether, but such resins are not entirely satisfactory from the standpoint of optimum heat-, water- and abrasion-resistance and in curing characteristics. One possible explanation for these deficiencies in desirable properties is the fact that the starting material contains thio groups that are aldehyde-non-reactable. In marked contrast the starting organic sulfides used in practicing this invention contain aldehyde-reactable thio groups attached to the pyrimidyl nucleus, thereby imparting to the condensation products of such sulfides with aldehydes increased heat-, water- and abrasion-resistance and improved curing characteristics as compared with resinous condensation products of an aldehyde and a pyrimidine thio-ether.

In practicing my invention the initial condensation reaction may be carried out at normal or at elevated temperatures, at atmospheric, sub-atmospheric or super-atmospheric pressures and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the diazine derivative may be carried out in the presence of solvents or diluents, fillers, other natural or synthetic resinous bodies, or while admixed with other materials that also can react with the aldehydic reactant or with the diazine derivative, e. g., ketones, urea (NH₂CONH₂), thiourea, selenourea, iminourea (guanidine), substituted ureas, thioureas, selenoureas and iminoureas, more particularly diurea, hydroxy urea, ethanol urea, unsymmetrical diphenyl urea, diethylene triurea, methyl urea, acetyl urea, benzoyl urea, phenyl thiourea, asymmetrical diethyl urea, allyl urea, 2-chloroallyl urea, ethylidene urea, methylol ureas, methylene ureas, dicyandiamide (cyano imino urea), guanyl urea, guanyl thiourea, biguanidine and guanoline (guanido carbonic ethyl ester); monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable diazines other than the diazine derivatives constituting the primary components of the resins of the present invention; aminotriazines, e. g., melamine, ammeline, ammelide, melem, melam, melon, formoguanamine, 2-amino-1,3,5-triazines and their substitution products, derivatives of melamine, e. g., 2,4,6-trihydrazino-1,3,5-triazine, 2,4,6-triethyltriamino-1,3,5-triazines, 2,4,6-triphenyltriamino-1,3,5-triazines, etc., nuclearly substituted aminotriazines, e. g., 1-cyano-2-amino-4,6-dimethyl-1,3,5-triazine, 2-chloro-4,6-diamino-1,3,5-triazine, 6-methyl-2,4-diamino-1,3,5-triazine, 2-alkyl-4-amino-6-hydroxy-1,3,5-triazines (e. g., 2-methyl-4-amino-6-hydroxy-1,3,5-triazine, etc.), 2-aryl-4-amino-6-hydroxy-1,3,5-triazines (e. g., 2-phenyl-4-amino-6-hydroxy-1,3,5-triazine, etc.), 2-phenyl-p-oxy-4,6-diamino-1,3,5-triazine, poly-amino triazines wherein the hydrogen atom of one or all of the amino groups are partially substituted by other amino groups, e. g., 2,4-diamino-6-hydrazino-1,3,5-triazine, 2-amino-4,6-dihydrazino-1,3,5-triazine, 2,4,6-trihydrazino-1,3,5-triazine, etc., poly-amino triazines wherein the hydrogen atoms of one or all of the amino groups are partially substituted by other monovalent substituents (e. g., alkyl, aryl, aralkyl, alkaryl, etc.), for instance 2-amino-4,6-diethyl-amino-1,3,5-triazine, 4-amino-2-methylamino-6-chloro-1,3,5-triazine, 4-amino-2,6-diphenyl-amino-1,3,5-triazine, 2,4-diamino-6-phenylamino-1,3,5-triazine, symmetrical trialkyl and triaryl melamines, the amidogen 1,2,3-triazines and the amidogen 1,2,4-triazines, specifically the amino (—NH₂) and the carbamyl (—CONH₂) and the thiocarbamyl (—CSNH₂) 1,2,3- and 1,2,4-triazines. Other examples of modifying reactants are phenol and substituted phenols, e. g., the cresols, the xylenols, the tertiary alkyl phenols and other phenols such as mentioned in my Patent No. 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like. These modifying reactants may be incorporated with the diazine derivative and the aldehyde by mixing all the reactants and effecting condensation therebetween or by various permutations of reactants. For instance, I may form a partial condensation product of ingredients comprising urea or melamine or urea and melamine, a diazine derivative of the kind herein described (for example, 4,6-diamino pyrimidyl-2 para - sulfamyl - phenyl - carbamyl-methyl sulfide, etc.) and an aldehyde, including polymeric aldehydes and aldehyde-addition products, for instance formaldehyde, paraformaldehyde, dimethylol urea, hexamethylol melamine, etc., and thereafter effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, curing agents, etc., may be used, for example, in the production of molding compositions.

The heat-curable resinous condensation products of this invention show excellent flow characteristics during a short curing cycle. This is a property that is particularly desirable in a molding compound. The molded articles have good surface finish and excellent resistance to water and arcing. They have a high dielectric strength.

Depending upon the particular conditions of reaction and the particular reactants employed, the intermediate or partial condensation products vary from clear, colorless or colored, syrupy, water-soluble liquids to viscous, milky dispersions and gel-like masses of decreased solubility in ordinary solvents, e. g., alcohol, dioxane, Cellosolve, ethylene glycol, glycerine, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance as surface coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

*Example 1*

| | Parts |
|---|---|
| 4,6 - diamino pyrimidyl - 2 para-sulfamyl-phenyl-carbamyl-methyl sulfide | 35.4 |
| Aqueous formaldehyde (approx. 37.1% HCHO) | 32.4 |
| Sodium hydroxide (0.46 N) | 1.0 |
| Chloroacetamide (monochloroacetamide) | 3.0 |

The above components were mixed together in an open reaction vessel and heated on a steam plate until the resulting resinous condensation product became a taffy-like solid. Twenty-three and one-tenth (23.1) parts alpha cellulose in flock form and 0.1 part of a mold lubricant, specifically zinc stearate, were added to the resinous mass and the mixture was stirred until homogeneous. The resulting composition was dried at room temperature for about 16 hours. A sample of the dried and ground composition was pressed in the form of a disk at a temperature of 140° C. and at a pressure of 3,600 pounds per square inch, using a molding time of 5 minutes. The molded disk was pulled hot from the mold and did not become distorted upon cooling to room temperature. The molded piece was well cured throughout and had a well-knit and homogeneous structure. The molding compound showed good flow characteristics during molding. The molded piece had good water resistance, as shown by the fact that when it was immersed in boiling water for 25 minutes and then in cold water for 5 minutes it absorbed only 1.45% by weight of water.

Instead of using chloroacetamide as above described in accelerating the curing of the potentially reactive resinous material, heat-convertible compositions may be produced by adding to the syrup direct or active curing catalysts (e. g., citric acid, phthalic anhydride, malonic acid, oxalic acid, etc) or latent curing catalysts (e. g., sodium chloroacetate, N-diethyl chloroacetamide, glycine ethyl ester hydrochloride, etc.) or by intercondensation with curing reactants other than monochloroacetamide (e. g., di- and trichloroacetamides, chloroacetonitriles, alpha, beta-dibromopropionitrile, aminoacetamide hydrochloride, aminoacetonitrile hydrochloride, ethylene diamine monohydrochloride, diethanolamine hydrochloride, nitrourea, chloroacetyl urea, chloroacetone, glycine, sulfamic acid, citric diamide, phenacyl chloride, etc.). Other examples of curing reactants that may be employed to accelerate or to effect the curing of the thermosetting or potentially thermosetting resins of this and other examples are given in various copending applications of mine, for instance in copending applications Serial No. 346,962, filed July 23, 1940, and Serial No. 354,395, filed August 27, 1940, both of which applications are assigned to the same assignee as the present invention, and wherein the following curing reactants, among others, specifically are mentioned: gamma-chlorobutyronitrile, chloroacetyl hydantoate, chloral hydrate, alpha, alpha'-dichloroacetone and para-chlorophenyl phenacyl bromide.

*Example 2*

| | Parts |
|---|---|
| Urea | 30.0 |
| 4,6-diamino pyrimidyl-2 para-sulfamyl—phenyl-carbamyl-methyl sulfide | 17.8 |
| Aqueous formaldehyde (approx. 37.1% HCHO) | 81.0 |
| Aqueous ammonia (approx. 28% NH₃) | 4.5 |
| Sodium hydroxide (0.46 N) | 1.8 |
| Sulfamic acid | 0.3 |

All of the above components with the exception of the sulfamic acid were heated together under reflux at boiling temperature for 13 minutes. The sulfamic acid was now added and refluxing was continued for an additional 1 minute. A molding compound was made from the resulting resinous syrup by mixing therewith 45.1 parts alpha cellulose and 0.2 part zinc stearate. The wet molding composition was dried at room temperature for about 16 hours. A sample of the dried and ground molding compound was molded for 5 minutes at 140° C. under a pressure of 3,600 pounds per square inch. The molded piece was well knit and homogeneous and showed excellent plastic flow during molding. The moisture resistance of the molded article was much better than that of an article similarly made from a urea-formaldehyde resin containing no pyrimidine derivative such as used in the above formula. Thus, the molded piece of this example absorbed only 2.5% water when subjected to a 25-minute water-absorption test such as described in Example 1, whereas molded articles similarly made from an unmodified urea-formaldehyde molding composition have a water-absorption value of approximately 5% to 7% when immersed in boiling water for only 15 minutes.

Example 3

| | Parts |
|---|---|
| Melamine | 37.8 |
| 4,6-diamino pyrimidyl-2 para-sulfamyl phenyl-carbamyl-methyl sulfide | 8.9 |
| Aqueous formaldehyde (approx. 37.1% HCHO) | 72.9 |
| Aqueous ammonia (approx. 28% NH₃) | 1.7 |
| Sodium hydroxide (0.46 N) | 2.0 |
| Glycine | 0.3 |

All of the above ingredients with the exception of the glycine were heated together under reflux at the boiling temperature of the mass for 18 minutes. The glycine was now added and the resulting mixture was made into a molding compound by mixing therewith 41.2 parts alpha cellulose and 0.2 part zinc stearate. The wet molding composition was dried at room temperature for about 16 hours. When a sample of the dried and ground molding compound was molded at 140° C. for 3½ minutes under a pressure of 3,600 pounds per square inch, a molded piece was obtained that was well cured throughout and had a well-knit and homogeneous structure. The water-absorption value of the molded article was only 0.59%, following the same procedure as described under Example 1 for determining the water resistance of the molded piece. The molding compound showed good plastic flow during molding.

Example 4

A phenol-formaldehyde liquid partial condensation product was prepared by heating together 90 parts phenol and 195 parts of an aqueous formaldehyde solution containing approximately 37.1% HCHO for 4 hours at 65° to 70° C., using 2.85 parts of potassium carbonate as a condensation catalyst. This partial condensation product is described in the following formula as "phenolic resin syrup":

| | Parts |
|---|---|
| Phenolic resin syrup | 60.0 |
| 4,6-diamino pyrimidyl-2 para-sulfamyl-phenyl-carbamyl-methyl sulfide | 8.9 |
| Sodium hydroxide (0.46 N) | 1.0 |
| Oxalic acid | 1.1 |

All of the above components with the exception of the oxalic acid were heated together under reflux for 20 minutes. The oxalic acid, dissolved in a small amount of water, was now added to the reaction mass. The resulting mixture was immediately compounded with 23.7 parts alpha cellulose and 0.1 part zinc stearate to form a molding compound. The wet molding compound was dried first at room temperature and then at 70° C. until sufficient moisture had been removed to yield a product that could be molded satisfactorily. A sample of the dried and ground molding composition was molded into the form of a disk at 140° C. under a pressure of 3,600 pounds per square inch, using a molding time of 8 minutes. The molded disk was well cured and had a well-knit, homogeneous structure. It showed excellent flow characteristics during molding. The molded piece had excellent water resistance as evidenced by the fact that, when tested for its water-absorption characteristics as described under Example 1, it absorbed only 1.2% by weight of water.

Example 5

| | Parts |
|---|---|
| Trimethylol melamine (crystalline) | 64.8 |
| 4,6-diamino pyrimidyl-2 para-sulfamyl-phenyl-carbamyl-methyl sulfide | 17.8 |
| Water | 50.0 |

The above ingredients were mixed and heated together under reflux at boiling temperature for 1 minute. To this mixture then was added 50 parts by weight of aqueous formaldehyde containing approximately 37.1% HCHO and heating was continued for an additional 2 minutes. Finally, 2.0 parts of 0.46 N sodium hydroxide and 1.7 parts of 28% aqueous ammonia were incorporated into the reaction mass and the entire mass was heated under reflux at boiling temperature for 11 minutes. At the end of this period of time 0.4 part of a curing reactant, specifically chloroacetamido ortho-hydroxy phenol (ortho-hydroxyphenyl-carbamyl chloro methane), was added and the resulting syrupy condensation product was mixed with 40 parts alpha cellulose and 0.2 part zinc stearate. The molding compound thereby produced was dried at room temperature until sufficient moisture had been removed to provide a compound that could be molded satisfactorily. A sample of the dried and ground compound was molded for 3½ minutes at 140° C. under a pressure of 3,600 pounds per square inch. The molded piece was well cured and had excellent water resistance as shown by the fact that it absorbed only 0.27% by weight of water when tested for its water-absorption value as described under Example 1. The molding compound showed good plastic flow during molding.

Compositions comprising an acid-curing thermosetting resin, more particularly acid-curing, thermosetting phenol-aldehyde and amidogen-aldehyde (e. g., urea-formaldehyde, melamine-formaldehyde, etc.) resins, carrying a curing agent therefor comprising a member of the class exemplified by chloroacetamido ortho-hydroxy phenol are more fully described and are specifically claimed in my copending application Serial No. 444,915, filed May 28, 1942, and assigned to the same assignee as the present invention.

The polymethylol aminotriazine mentioned in the above formula may be replaced in whole or in part by other aldehyde-addition products, e. g., by a methylol urea, specifically dimethylol urea, by a methylol guanazole, specifically dimethylol guanazole, etc.

Example 6

| | Parts |
|---|---|
| Soya bean protein | 30.0 |
| 4,6-diamino pyrimidyl-2 para-sulfamyl-phenyl-carbamyl-methyl sulfide | 17.8 |
| Aqueous formaldehyde (approx. 37.1% HCHO) | 81.0 |
| Sodium hydroxide (0.46 N) | 2.0 |
| Water | 50.0 |
| Ethylene bis N-chloroacetamide (N,N'-bis-chloroacetyl ethylene diamine) | 0.2 |

All of the above ingredients with the exception of the ethylene bis N-chloroacetamide (a curing reactant) were heated together under reflux at boiling temperature for 4 minutes. The N-chloroacetamide was now added and the resulting mixture immediately was mixed with 41.4 parts alpha cellulose and 0.2 part zinc stearate to form a molding compound. The wet compound was air dried at room temperature. A well-cured molded piece was produced by molding a sample of the dried and ground compound for 3 minutes at 140° C. under a pressure of 3,600 pounds per square inch.

Compositions comprising an acid-curing thermosetting resin, more particularly acid-curing, thermosetting phenol-aldehyde and amidogen-aldehyde resins carrying a curing agent therefor comprising a member of the class exemplified by N,N'-bis-chloroacetyl ethylene diamine [alpha, beta-bis-(chloroacetamido) ethane] are more fully described and are specifically claimed in my copending application Serial No. 431,888, filed February 21, 1942, which application is a continuation-in-part of the present case and is assigned to the same assignee as the present invention.

Example 7

| | Parts |
|---|---|
| Bis-(thioammeline diethyl ether) | 17.7 |
| 4,6-diamino pyrimidyl-2 para-sulfamyl-phenyl-carbamyl-methyl sulfide | 17.7 |
| Aqueous formaldehyde (approx. 37.1% HCHO) | 40.5 |
| Sodium hydroxide (0.46 N) | 1.0 |
| Water | 50.0 |
| Para-(chloroacetamido) benzene sulfonamide (para-sulfamyl-phenyl-carbamyl chloro methane) | 0.4 |

All of the above ingredients with the exception of the para-(chloroacetamido) benzene sulfonamide (a curing reactant) were heated together under reflux at boiling temperature for 15 minutes. The chloroacetamido benzene sulfonamide was added to the syrupy partial condensation product and the resulting mixture immediately was mixed with 42.4 parts alpha cellulose and 0.2 part zinc stearate to form a molding (moldable) composition. The wet molding compound was dried at room temperature for about 16 hours. A well-cured molded piece having a well-knit and homogeneous structure was produced by molding a sample of the dried and ground molding compound for 4 minutes at 140° C. under a pressure of 3,600 pounds per square inch.

Compositions comprising an acid-curing thermosetting resin, more particularly acid-curing, thermosetting phenol-aldehyde and amidogen-aldehyde resins carrying a curing agent therefor comprising a member of the class exemplified by para-(chloroacetamido) benzene sulfonamide are more fully described and are specifically claimed in my copending application Serial No. 432,658, filed February 27, 1942, which application is a continuation-in-part of the present case and is assigned to the same assignee as the present invention.

Example 8

| | Parts |
|---|---|
| 4,6-diamino pyrimidyl-2 para-sulfamyl-phenyl-carbamyl-methyl sulfide | 35.4 |
| Furfural | 57.6 |
| Aqueous ammonia (approx. 28% NH3) | 3.0 |
| Sodium hydroxide (0.46 N) | 1.5 |

The above ingredients were heated together under reflux at boiling temperature for 15 minutes, yielding a clear, dark-colored resinous syrup. The syrupy condensation product was tested for its curing characteristics by treating small samples of it with various curing agents and heating the resulting mixture on a 140° C. hotplate. Glycine, sulfamic acid, chloroacetamide, polysalicylide, phenacyl chloride and other curing agents such as mentioned under Example 1 were employed. These agents caused the resinous syrup to convert rapidly at 140° C. to a cured or insoluble and infusible state. The cured resins could be removed from a 140° C. hotplate in thin sheet form, showing that good cohesiveness and flexibility might be expected from plastic compositions made from the resin of this example.

Example 9

| | Parts |
|---|---|
| 4,6-diamino pyrimidyl-2 para-sulfamyl-phenyl-carbamyl-methyl sulfide | 35.4 |
| Acrolein | 33.6 |
| Sodium hydroxide (0.46 N) | 1.5 |
| Water | 100.0 |

The above components were mixed (the acrolein being added last) and then refluxed at boiling temperature for 16 minutes. During this reflux period a resinous precipitate formed. This resinous material was potentially heat-curable as shown by the fact that, when small samples of it were mixed with such curing agents as chloroacetamide, polysalicylide, sulfamic acid, glycine, phenacyl chloride, sodium chloroacetate, alpha, beta-dibromopropionitrile, etc., followed by heating on a 140° C. hotplate, the resinous mass was converted to an infusible solid. The resinous composition of this example is light-colored and would be suitable for use in the production of molding compositions.

Example 10

| | Parts |
|---|---|
| 4,6-diamino pyrimidyl-2 para-sulfamyl-phenyl-carbamyl-methyl sulfide | 35.4 |
| Aqueous formaldehyde (approx. 37.1% HCHO) | 81.0 |
| Butyl alcohol | 74.0 |
| Sodium hydroxide (0.46 N) | 1.5 |

The above ingredients were mixed in an open reaction vessel and thereafter heated on a steam plate. After heating for several minutes, a clear syrup formed. The syrupy material thereby obtained was found to be soluble in butyl alcohol, ethylene glycol, Cellosolve and similar solvents. When the syrupy condensation product was heated further, a resinous precipitate formed. This solid resin was found to be insoluble in the above solvents. When small samples of the resinous precipitate were tested with various curing agents (e. g., glycine, sulfamic acid, chloroacetamide, etc.), infusible resinous masses were produced when the individual samples were heated on a 140° C. hotplate.

The resinous composition of this example is suitable for use both in the production of molding compositions and in the manufacture of spirit and baking varnishes. It may be used as a modifier of varnishes of the aminoplast and alkyd-resin types.

Example 11

| | Parts |
|---|---|
| 4,6-diamino pyrimidyl-2 para-sulfamyl-phenyl-carbamyl-methyl sulfide | 35.4 |
| Acetamide | 5.8 |
| Aqueous formaldehyde (approx. 37.1% HCHO) | 81.0 |
| Sodium hydroxide (0.46 N) | 1.5 |

All of the above components were heated together under reflux at boiling temperature for 21 minutes. The plasticizing effect of the acetamide was evident from the greater flow of the resin, when tested on a 140° C. hotplate, as compared with similar resins made without acetamide. The curing characteristics of the resin are accelerated by incorporating therein chloroacetamide and other curing agents such as mentioned under Example 1.

Example 12

| | Parts |
|---|---|
| 4,6 - diamino pyrimidyl - 2 para - sulfamyl-phenyl-carbamyl-methyl sulfide | 35.4 |
| Diethyl malonate | 16.0 |
| Aqueous formaldehyde (approx. 37.1% HCHO) | 81.0 |
| Sodium hydroxide (0.46N) | 1.5 |
| Aqueous ammonia (approx. 28% NH₃) | 3.0 |

The above components were heated together under reflux at boiling temperature for 3 minutes. A portion of the resulting syrup, when poured on a 140° C. hotplate, formed a sheet having excellent cohesive characteristics. The syrupy condensation product of this example is potentially heat-hardenable, as shown by the fact that when small samples of the syrup were treated with various curing agents, for example, glycine, sulfamic acid, chloroacetamide and others such as mentioned under Example 1, followed by heating on a 140° C. hotplate, the syrup was converted into an insoluble and infusible state.

Example 13

| | Parts |
|---|---|
| 4,6-diamino pyrimidyl-2 para-sulfamyl-phenyl-carbamyl-methyl sulfide | 35.4 |
| Polyvinyl alcohol | 4.4 |
| Aqueous formaldehyde (approx. 37.1% HCHO) | 81.0 |
| Sodium hydroxide (0.46 N) | 1.5 |
| Water | 50.0 |

The above ingredients were heated together under reflux for 3 minutes, yielding a milky-white, viscous mass that could be used either in the production of molding compounds or coating compositions, especially where toughness of the surface is a desirable characteristic. When various curing agents such as mentioned under Example 1 were incorporated either into the syrupy condensation product or into the dehydrated resin, the resulting mixture cured rapidly to an insoluble and infusible state when heated on a 140° C. hotplate. When glass plates were coated with samples of the syrupy resin (with or without a curing agent) and the coated plates were baked at 70° C., baked films were formed on the plates that were mar proof, water resistant and tightly adherent to the glass surface.

It will be understood, of course, by those skilled in the art that my invention is not limited to condensation products obtained by reaction of ingredients comprising an aldehyde and the specific diamino diazinyl sulfamyl-carbocyclic-carbamyl-alkyl sulfide named in the above illustrative examples. Thus, instead of 4,6-diamino pyrimidyl-2 para - sulfamyl - phenyl - carbamyl-methyl sulfide mentioned in the above examples, any other organic sulfide of the kind with which this invention is concerned may be employed, for example 4,6-diamino pyrimidyl-2 ortho-sulfamyl-phenyl-carbamyl-methyl sulfide, 4,6-diamino pyrimidyl-2 meta-sulfamyl-phenyl-carbamyl-methyl sulfide, the 2,6-amino pyrimidyl-4 ortho-, meta- and para-sulfamyl-phenyl-carbamyl-methyl sulfides, the diamino pyrimidyl sulfamyl - phenyl - thiocarbamyl - methyl sulfides, the diamino pyrimidyl sulfamyl-tolyl-carbamyl-methyl sulfides, the diamino pyrimidyl sulfamyl-tolyl-thiocarbamyl-methyl sulfides, the diamino pyrimidyl sulfamyl-phenyl-carbamyl-ethyl sulfides, the diamino pyrimidyl sulfamyl-phenyl-thiocarbamyl-ethyl sulfides, the diamino pyrimidyl sulfamyl-tolyl-carbamyl-ethyl sulfides, the diamino pyrimidyl sulfamyl-tolyl-thiocarbamyl-ethyl sulfides, and others such as hereinbefore mentioned by way of illustration.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, valeraldehyde, caproaldehyde, methacrolein, crotonaldehyde, benzaldehyde, furfural, etc., mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives, of urea, thiourea, selenourea and iminourea, substituted ureas, selenoureas, thioureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, mono- and poly-(N-carbinol) derivatives of the aminotriazines, etc. Particularly good results are obtained with active methylene-containing bodies such as a methylol urea, more particularly mono- and dimethylol ureas, and a methylol aminotriazine, specifically a methylol melamine, e. g., monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the pyrimidine derivative may be varied over a wide range, but ordinarily the reactants are employed in an amount corresponding to at least one mol of the aldehyde, specifically formaldehyde, for each mol of the pyrimidine derivative. Thus, I may use, for example, from one to five or six mols of an aldehyde for each mol of pyrimidine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance, 10 or 12 or more mols of such alkylol derivatives for each mol of the pyrimidine derivative.

As indicated hereinbefore, and as further shown by a number of the examples, the properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, acryloamide, benzamide, toluene sulfonamides, benzene disulfonamides, benzene trisulfonamides, adipic diamide, phthalamide, etc.; amines such as ethylene diamine, phenylene diamine, etc.; phenol and substituted phenols, including aminophenols, etc.; ketones, including halogenated ketones; nitriles, including halogenated nitriles, e. g., acrylonitrile, methacrylonitrile, succinonitrile, chloroacetonitrile, etc.; acylated ureas, more particularly halogenated acylated ureas of the kind described, for example, in my copending application Serial No. 289,273, filed August 9, 1939, now Patent No. 2,281,559, issued May 5, 1942; and others.

The modifying bodies also may take the form of high molecular weight bodies with or without resinous characteristics, for example, hydrolyzed wood products, formalized cellulose derivatives, lignin, protein-aldehyde condensation products, aminotriazine-aldehyde condensation products, aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a diazine derivative of the kind herein described and an aldehyde, e. g., formaldehyde, I may cause an aldehyde to condense with a salt (organic or inorganic) of the diazine derivative or with a mixture of the diazine derivative and a salt thereof. Examples of organic and inorganic acids that may be used in the preparation of such salts are hydrochloric, sulfuric, phosphoric, boric, acetic, chloroacetic, propionic, butyric, valeric, acrylic, polyacrylic, oxalic, methacrylic, polymethacrylic, malonic, succinic, adipic, malic, maleic, fumaric, benzoic, salicylic, camphoric, phthalic, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The thermosetting molding compositions of this invention are usually molded at temperatures of the order of 100° to 200° C. and at pressures of the order of 1,000 to 5,000 pounds or more per square inch.

The modified or unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the reaction product of ingredients comprising an aldehyde and a compound corresponding to the general formula

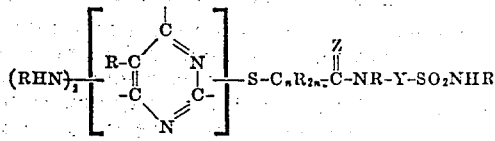

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

2. A composition as in claim 1 wherein the aldehyde is formaldehyde.

3. A composition as in claim 1 wherein the reaction product is an alkaline-catalyzed reaction product of the stated components.

4. A composition of matter comprising the reaction product of ingredients comprising an aldehyde and a compound corresponding to the general formula

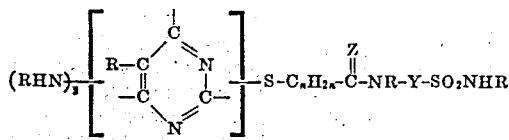

where $n$ represents an integer and is at least 1 and not more than 2, Z represents a member of the class consisting of oxygen and sulfur; Y represents a divalent carbocyclic radical, and R represents a member of the class consisting of hydrogen and monovalent hydrocarbon and halo-hydrocarbon radicals.

5. A heat-curable resinous composition comprising a heat-convertible condensation product of ingredients comprising formaldehyde and a compound corresponding to the general formula

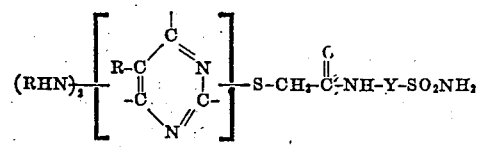

where Y represents a divalent carbocyclic radical and R represents a member of the class consisting of hydrogen and monovalent hydrocarbon and halo-hydrocarbon radicals.

6. A product comprising the heat-cured resinous composition of claim 5.

7. A resinous composition comprising the product of reaction of ingredients comprising an aldehyde and a diamino pyrimidyl sulfamyl-carbocyclic-carbamyl-methyl sulfide.

8. A resinous composition comprising the product of reaction of ingredients comprising formaldehyde and a diamino pyrimidyl sulfamyl-phenyl-carbamyl-methyl sulfide.

9. A resinous composition comprising the product of reaction of ingredients comprising an aldehyde and a diamino pyrimidyl sulfamyl-tolyl-carbamyl-methyl sulfide.

10. A composition comprising the product of reaction of ingredients comprising a urea, an aldehyde and a compound corresponding to the general formula

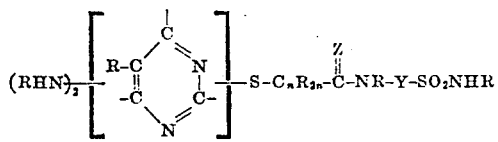

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

11. A composition as in claim 10 wherein the urea component is the compound corresponding to the formula $NH_2CONH_2$ and the aldehyde is formaldehyde.

12. A heat-curable composition comprising the heat-convertible resinous reaction product of (1) a partial condensation product of ingredients comprising formaldehyde and a diamino pyrimidyl sulfamyl-carbocyclic-carbamyl-methyl sulfide, and (2) a curing reactant.

13. A resinous composition as in claim 12 wherein the curing reactant is a chlorinated acetamide.

14. A product comprising the cured composition of claim 12.

15. A composition comprising the product of reaction of ingredients comprising urea, formaldehyde and 4,6-diamino pyrimidyl-2 para-sulfamyl-phenyl-carbamyl-methyl sulfide.

16. A composition comprising the product of reaction of ingredients comprising a methylol urea and a diamino pyrimidyl sulfamyl-phenyl-carbamyl-methyl sulfide.

17. A composition comprising the product of reaction of ingredients comprising a polymethylol aminotriazine and a diamino pyrimidyl sulfamyl-phenyl-carbamyl-methyl sulfide.

18. A composition comprising the product of reaction of ingredients comprising melamine, formaldehyde and 4,6-diamino pyrimidyl-2 para-sulfamyl-phenyl-carbamyl-methyl sulfide.

19. A resinous composition comprising the product of reaction of (1) a partial condensation product of ingredients comprising urea, formaldehyde and 4,6-diamino pyrimidyl-2 para-sulfamyl-phenyl-carbamyl-methyl sulfide, and (2) a chlorinated acetamide.

20. The method of preparing new condensation products which comprises effecting reaction between ingredients comprising an aldehyde and a compound corresponding to the general formula

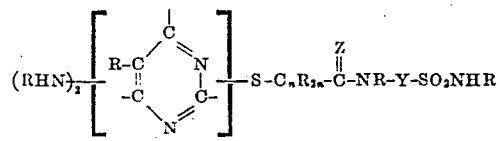

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

21. A composition comprising the product of reaction of ingredients comprising an aminotriazine, an aldehyde and a compound corresponding to the general formula

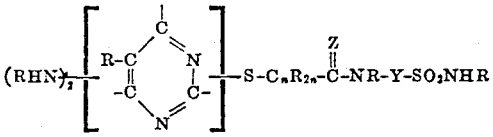

where $n$ represents an integer and is at least 1 and not more than 2, Z represents a member of the class consisting of oxygen and sulfur, Y represents a divalent carbocyclic radical, and R represents a member of the class consisting of hydrogen and monovalent hydrocarbon and halo-hydrocarbon radicals.

GAETANO F. D'ALELIO.

CERTIFICATE OF CORRECTION.

Patent No. 2,312,693. March 2, 1943.

GAETANO F. D'ALELIO.

It is hereby certified that error appears in the printed specification of the above numbered patent requiring correction as follows: Page 2, first column, line 51-52, for "phenyl-thiocarbamyl-phentyl" read --phenyl-thiocarbamyl-pentyl--; and second column, line 22-23, for "(alpha-bromo-phenyl)" read --(alpha-bromophenyl)--; page 5, first column, line 3, Example 3, for "para-sulfamyl" read -- para-sulfamyl- --; page 7, first column, line 71, for "2,6-amino" read --2,6-diamino--; and that the said Letters Patent should be read with this correction therein that the same may conform to the record of the case in the Patent Office.

Signed and sealed this 11th day of May, A. D. 1943.

(Seal)

Henry Van Arsdale,
Acting Commissioner of Patents.